Nov. 4, 1930.　　　　W. L. PAUL　　　　1,780,503
POWER TRANSMITTING MECHANISM
Filed Dec. 3, 1928　　　2 Sheets-Sheet 1

Witness
Milton Lenoir

Inventor
William L. Paul.
By Brown, Jackson, Boettcher & Dieners.
Attorneys

Nov. 4, 1930.     W. L. PAUL     1,780,503
POWER TRANSMITTING MECHANISM
Filed Dec. 3, 1928     2 Sheets-Sheet 2

Inventor.
William L. Paul,
By Brown, Jackson, Boettcher & Dienner.
Attorneys

Witness
Milton Lenoir

Patented Nov. 4, 1930

1,780,503

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

POWER-TRANSMITTING MECHANISM

Application filed December 3, 1928. Serial No. 323,490.

This invention relates to power transmission mechanism for transmitting draft force from a tractor to a load to be drawn thereby, such as an agricultural implement. The particular embodiment of my invention illustrated in the accompanying drawing is especially applicable for the attachment of plows or other earth working implements to a tractor, but the invention generically considered may also be advantageously employed for transmitting draft force to various other machines and devices, including not only agricultural implements but machinery designed for other uses. Therefore, while the following description of the illustrated construction deals more specifically with the application of my improvements to the connection of a plow with a tractor, it is not to be construed as restricting the invention to use for that purpose only.

In hitching a plow or other implement behind a tractor, it is desirable that the point of attachment of the draft connection or connections with the tractor be high enough above the ground to provide sufficient clearance to prevent the accumulation of trash, or, should the implement be a cultivator, to avoid damaging growing plants.

The location of the hitch at a high point on the tractor is, however, objectionable, because it tends to reduce the traction of the front wheel or wheels, and in that way makes steering difficult, and besides in some cases causes the tractor to tip backward, even to the point of upsetting it. To avoid this objection it has heretofore been proposed to connect the implement with the tractor by draft connections having physical connection with the tractor at points located below the axis of the traction wheels and near the surface of the ground, but so far as I am aware, such prior devices have not proven successful.

By my present invention I provide draft connections that are physically attached to the tractor frame at a point high enough above the ground to afford ample clearance, and are so constructed and arranged that the effective draft force is transmitted to the implement from a point or points located below the actual hitch point, or point of physical connection, of the draft connections with the tractor frame, and preferably in close proximity to the point of contact of the tractor wheels with the ground. By such means the resistance of the load will not act to raise the front end of the tractor or its steering wheels off the ground and the danger of backward tipping of the tractor is thus avoided. My invention also provides for attaching the draft connections to the tractor flexibly, so that the trailing implement is not adversely affected by vertical oscillation of the tractor in passing over uneven ground.

A further feature of my invention which is peculiarly advantageous where the machine drawn is a plow or analogous implement, is that it provides for connecting the plow to a tractor so that the plow may be vertically adjusted, or raised and lowered, without disturbing the draft connections, the plow bodies being meanwhile held in the operating position at which they are set. As further features of invention, provision is made for facilitating turning of the tractor, and for backing the implement by the power of the tractor.

In the accompanying drawings—

Figure 1:
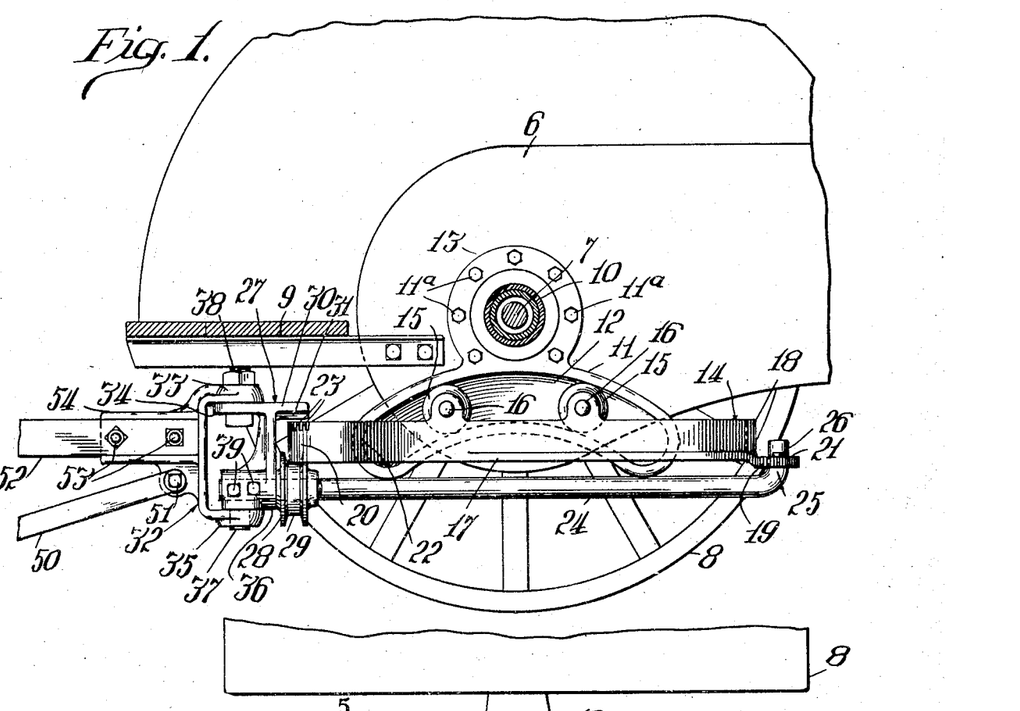
Fig. 1 is a partial side elevation of the rear portion of a tractor, the right hand rear wheel being removed and certain parts being shown in section.

Referring to the drawings,—6 indicates the frame of a tractor, 7 the rear axle thereof, and 8 the usual rear traction wheels, which in the present instance are operatively connected with the axle 7 and are driven thereby. Preferably, the tractor frame carries an operator's platform 9 that extends rearwardly therefrom as shown in Fig. 1. The rear axle housing is indicated at 10.

Mounted at each side of the tractor, between the frame 6 thereof and the adjacent rear wheel 8, is a bracket 11 that is rigidly secured to the tractor frame, preferably by bolts 11ª that are carried by a centrally located hub portion 13 of the bracket, as best shown in Fig. 1, this hub portion being concentrically located with respect to the rear axle 7. The major portion of each bracket 11 is preferably arcuate in form and lies below the axle 7, its end portions extending equally in front and back of the axis of the rear wheels. Each of these brackets is provided with an outwardly opening arcuate groove or channel 12 having its center of curvature located at a point below it, and preferably at or near the point of contact of the proximate wheel 8 with the ground. These two brackets are alike, but of course they are oppositely mounted on the tractor frame, as clearly shown in Fig. 2.

Figure 2:
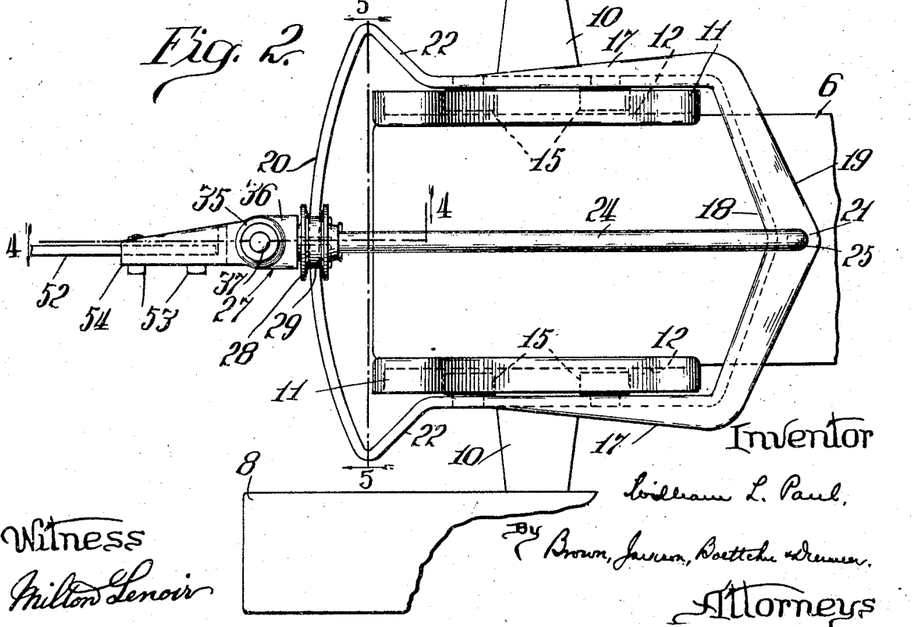
Fig. 2 is an underside view of the rear portion of the tractor frame and the draft connections attached thereto.

A draft frame 14, the shape or contour of which is best shown in Fig. 2, is located under the rear portion of the tractor frame 6 so that it extends around the end portions of the two brackets 11. In the present instance, it is supported from said brackets by means of two pairs of rollers 15 that are mounted on journals 16 carried by the side members 17 of the frame 14, or in any other suitable way. The journals 16 carried by each side member 17 are spaced apart, as best shown in Fig. 1, and are at opposite sides of, and normally equally distance from, a transverse vertical plane intersecting the axis of the rear wheels. In the construction shown, they extend inwardly from the side members 17, and the rollers 15 are mounted upon their inwardly extending ends and lie in the grooves 12, against the upper or lower margins of which they are adapted to bear. Draft force is transmitted to the draft frame through these rollers and the brackets 11, the grooves 12, in conjunction with said rollers, providing a flexible draft connection between the tractor and the draft frame.

The frame 14, therefore, is capable of oscillating vertically with respect to the tractor frame, and by connecting a trailing implement with said frame draft power may be transmitted to such implement.

Figure 5:
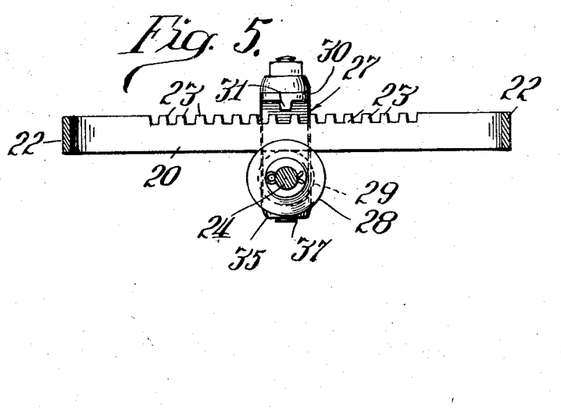
Fig. 5 is also a detail, being a partial vertical cross-section on line 5—5 of Fig. 2.

The front portion of the frame 14 is preferably V-shaped as shown at 18 in Fig. 2, and such front portion is provided with a forwardly extending marginal flange 19, as best shown in Fig. 1. The rear portion of said frame comprises a bar 20 curved in an arc centered at the central point 21 of the flange 19. The rear member 20 is somewhat longer than the distance between the side members 17, and accordingly the rear end portions of said side members are flared outwardly to the point of their juncture with the member 20, as shown at 22 in Fig. 2. The upper margin of the member 20 is provided adjacent to its center with a number of notches 23, as best shown in Figs. 2 and 5, but its lower margin is smooth, for purposes that will presently be explained.

A draft transmitting member in the form of a draft bar 24 extends longitudinally of the tractor under the draft frame 14, and has an upturned forward end 25 that is journaled in a hole provided in the flange 19 at the point 21. A key 26 in such upturned end secures it against withdrawal. The rear end of the draft bar 24 carries a bracket 27, best shown in Figs. 1 and 4, and also a grooved roller 28 which is located adjacent to the bracket 27 with its groove 29 underlying and receiving the lower margin of the rear member 20 of the frame 14. Such member, therefore, serves as a track for said roller and guides it as the draft bar swings laterally about its center 21.

The bracket 27 is provided with a forwardly extending lug 30 having a downwardly extending dog 31 that, when the roller 28 is in engagement with the under margin of the member 20, extends over but is out of contact with the upper margin of said member. The member 20 may, however, be moved up high enough for the dog 31 to engage in one of the notches 23 by oscillation of the draft frame 14, or by slight downward movement of the rear end of the draft bar 24. Obviously, when such engagement occurs, lateral swinging of the draft bar with respect to the frame 14 will be prevented. This locking occurs only when the tractor is backed, and normally the parts are in the position shown in Figs. 1, 4 and 5, with the lower margin of the rear member 20 of the draft frame in engagement with the bottom of the groove 29.

Figure 4:
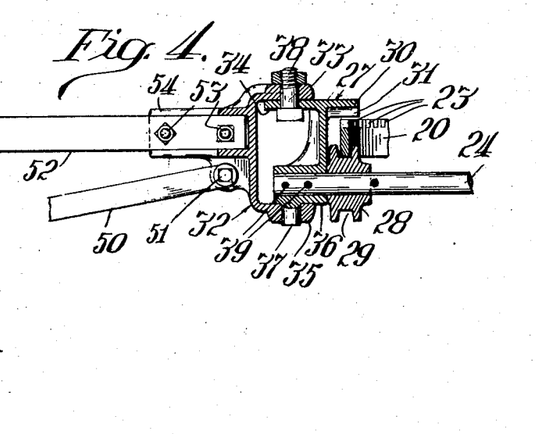
Fig. 4 is a detail, being a partial longitudinal vertical section on line 4—4 of Fig. 2.

The bracket 27 constitutes part of a coupling for connecting a plow or other implement with the draft bar 24, the other part of such coupling comprising a bracket 32 in the form of a yoke, the upper member 33 of which overlaps a rearwardly projecting arm 34 carried by the bracket 27, while the lower member 35 of said yoke overlaps the lower portion of the bracket 27, which is in the form of a sleeve 36 flattened at its under side. This flattened sleeve has a downwardly projecting trunnion 37 that is journaled in a suitable bearing in the yoke member 35, as shown in Fig. 4, and the yoke member 33 is pivotally connected with the bracket member 34 by a bolt 38, which is in axial alinement with the trunnion 37. The rear end of the draft bar 24 is fitted in the sleeve 36, and is firmly secured thereto by rivets or bolts 39.

By this arrangement the coupling made up of the bracket 27 and yoke 32 provides a vertical pivot connection by which a plow or other implement may be attached to the draft bar 24 so as to be capable of swinging laterally relatively thereto.

Figure 3:
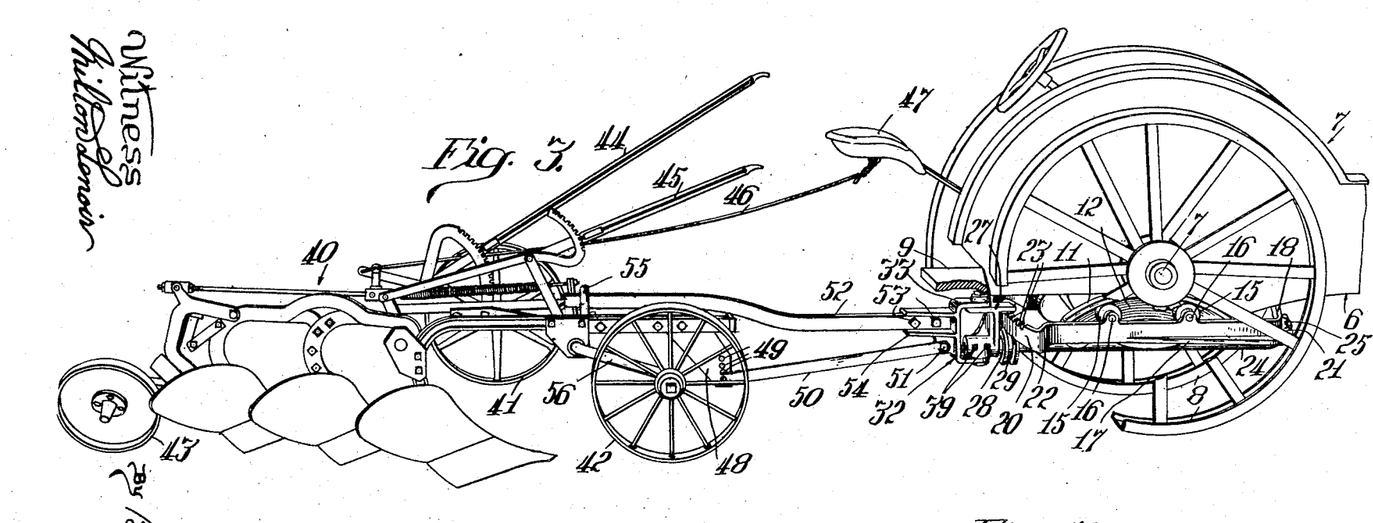
Fig. 3 is a perspective view, with some parts broken away, illustrating my improved draft connections applied to the connection of a plow to a tractor.

In Fig. 3 I have shown the connections used where the implement to be drawn is a plow, indicated as an entirety by the reference numeral 40. The plow illustrated is a well-known power lift gang plow having a land wheel 41, a front furrow wheel 42, a rear furrow wheel 43, a depth adjusting lever 44, and a leveling lever 45. A cable 46 that is connected with the usual trip lever by which the operation of the usual half revolution clutch that forms a part of the power lift mechanism by which the lifting and lowering of the plow bodies is controlled, extends forward to and is preferably connected with the driver's seat 47 on the tractor frame. By pulling on the cable 46 the clutch mechanism is thrown into operation to either raise or lower the plow bodies, as the case may be, in the well-known manner. A hitch plate 48 extends forward and downward from the front portion of the plow frame, with which it is rigidly connected, said plate being provided with a number of holes 49 at different heights to provide for vertical adjustment of the draft connections.

The plow illustrated is connected with the yoke 32, and through it with the draft bar 24, by means of a draft connection 50, the rear end of which is connected with the hitch plate 48 at one or another of the holes 49, while its forward end is connected with said yoke by a pivot bolt 51. Through the hitch connection 50 the draft of the tractor is transmitted to the plow frame.

To prevent buckling of the draft connections at the point 51, a rigid bar 52 is provided, which at its forward end is rigidly connected by bolts 53 with a rearwardly extending arm 54 carried by the yoke 32. The bar 52 extends rearwardly over and rests upon the front portion of the plow, its end extending through and being slidably held by a loop 55 secured to the plow frame. Thus downward pressure of the bar is transmitted to the plow frame at a point approximately over the front furrow wheel crank axle 56, as shown in Fig. 3. By connecting said bar with the plow frame as described the down thrust of the rear end of said bar is sustained by the wheels of the implement when being pulled and has no appreciable effect on its stability or suction. While I prefer to provide a pivotal connection between the rear portion of the bar 52 and the plow frame, as by the loop member 55, it is not essential that these parts be definitely connected together, as said bar will function for the purpose stated, under normal plowing conditions, if it merely extends over and bears downwardly upon the plow frame.

When the tractor is advancing on level ground the draft is transmitted to the plow, or other implement, from the tractor frame through the draft frame 14 by means of the draft bar 24, the coupling comprising the members 27 and 32, and the draft connection 50. Owing, however, to the connection of said draft frame with the tractor frame by means of the rollers 15 operating in the arcuate grooves 12, the effective hitch point of the draft connections to the tractor is located at a point a considerable distance below said draft frame and in close proximity to the point of contact of the tractor wheels with the ground. The tractive effort placed on the draw bar 52 by the implement and through that bar and the draw bar 24 to the frame work 22, under the conditions as shown, is in a horizontal direction and extends rearwardly of the tractor. This causes the forward roller 15 to bear down on the bottom of the slot 12 and the rearward roller 15 to bear against the upper portion of the slot 12. Both of these forces against the slot 12 are perpendicular to it at the point of contact and hence radial of the slot so that the components of the two forces placed on the slot structure by the rollers intersect at the center of the arc, that is, at the point at which the wheel 8 bears upon the ground. The rearward force acting upward through this point and the forward force acting downward through it, tend to rotate the tractor in a clockwise direction, Fig. 1, about the bearing point of the wheel 8 on the ground and as a result the front end of the tractor is urged downward to keep the front wheels firmly on the ground. The resultant effect of the forces through the rollers 15 is the same as if a single force were applied to the tractor at the point at which the wheel 8 engages the ground. This effective force is acting in direct opposition to the forces placed on the front end of the tractor by the meshing of the driving gears, the forces which tend to raise the front end of the tractor under heavy loads, and since the forces of the effective hitch are equal to or slightly greater than the forces tending to raise the front end of the tractor, that front end is maintained firmly on the ground even under conditions of extreme loads.

Thus, the advantages of a low hitch point are obtained although the actual connections between the draft devices and the tractor are located high enough above the ground to provide the necessary clearance, and by reason of such construction the resistance of the load drawn by the tractor will not react to lift the steering wheel or wheels or materially lessen their weight on the ground. Endwise tilting of the tractor due to its passing over uneven ground is compensated for by the oscillatory mounting of the draft frame 14, so that such movements of the tractor do not affect the proper transmission of the draft to the implement. The bar 52 provides a vertically rigid connection by which said draft frame is always held substantially in a horizontal plane, thereby preventing the rollers 15 from tending to move backward in the arcuate grooves under the influence of the draft.

During forward travel in a straight line the draft bar 24 extends rearwardly centrally under the draft frame 14, as shown in Fig. 2, and is in alinement with the draft connection 50. When, however, the tractor is steered in one direction or the other, the draft bar 24 swings laterally with respect to the draft frame 14 about the point 21, thereby carrying the coupling comprising the members 27 and 32 laterally along the curved rear member 20 of the draft frame 14. If the tractor be turned far enough to cause said coupling to reach one end or the other of said bar, further turning of the tractor in the same direction will cause the pivoting of the coupling member 32 about its vertical axis provided by the trunnion 37 and bolt 38.

By pivotally connecting the draft bar 24 with the tractor at a point forward of the hitch point of the implement thereto, the tractor steers more easily, and the pivotal connection of the coupling between said bar and the implement further contributes to that end.

When the tractor is traveling ahead, the roller 28 bears against the under margin of the transverse rear bar 20 of the draft frame, and the dog 31 is then out of engagement with the notches in the upper margin of said bar, as has been explained, the draft bar 24 thus being left free to swing laterally with respect to said draft frame. When, however, the tractor is backed, the draft frame 14 is pushed forward slightly, which causes it to oscillate slightly and raises its rear member 20 into engagement with the dog 31, thereby locking the draft bar 52 against lateral swinging, so that the backing force is applied to the front end of the draft connection 50 at a practically fixed central point on the draft frame.

Owing to the pivotal connection between the draft connection 50 and the coupling member 32 the plow bodies may be freely adjusted vertically, either for regulation of the depth of plowing, or for raising and lowering them out of or into operative relation to the ground, without disturbing the draft connections.

While I have particularly described the construction illustrated in the accompanying drawings, it should be understood that my invention is not restricted to such construction, but includes such variations or modifications as would occur to those skilled in the art. The claims hereinafter made are, therefore, to be construed accordingly.

The term "draft frame" as used in the broader claims is intended to comprehend not alone an open framework such as the part 14, but also any equivalent means that constitutes a draft connection with the tractor adapted to oscillate about a point lying below the point of its physical connection therewith.

I claim:

1. A hitch connection for tractors comprising a draft frame connected with the tractor to oscillate vertically about a point lying below the point of physical connection of said draft frame with the tractor, and rearwardly extending draft transmitting means pivotally connected with said draft frame.

2. A hitch connection for tractors comprising a draft frame connected with the tractor to oscillate vertically about a point lying below the point of physical connection of said draft frame with the tractor, and rearwardly extending draft transmitting means connected with said draft frame to swing laterally relatively to the tractor.

3. A hitch connection for tractors comprising a draft frame connected with the tractor to oscillate vertically about a point lying below the point of physical connection of said draft frame with the tractor, and rearwardly extending draft transmitting means connected with said draft frame to swing laterally relatively to the tractor and to said frame.

4. A hitch connection for tractors comprising a draft frame connected with the tractor to oscillate vertically about a point lying below the point of physical connection of said draft frame with the tractor, and draft transmitting means connected with said draft frame in advance of the connection of said frame with the tractor.

5. A hitch connection for tractors comprising a draft frame connected with the tractor to oscillate vertically about a point lying below the point of physical connection of said draft frame with the tractor, and draft transmitting means connected with said draft frame in advance of the connection of said frame with the tractor, and extending rearwardly under said draft frame.

6. A hitch connection for tractors comprising a draft frame connected with the tractor to oscillate vertically about a point lying below the point of physical connection of said draft frame with the tractor, and draft transmitting means connected with said draft frame in advance of the connection thereof with the tractor and above the center of oscillation of said frame.

7. A hitch connection for tractors comprising a draft frame connected with the tractor to oscillate vertically about a point lying below the point of physical connection of said draft frame with the tractor, and draft transmitting means connected with said draft frame in advance of the connection thereof with the tractor and above the center of oscillation of said frame, and extending rearwardly under said draft frame.

8. A hitch connection for tractors comprising a draft frame connected with the tractor to oscillate vertically about a point lying below the point of physical connection of said draft frame with the tractor, and draft transmitting means pivotally connected with said draft frame in advance of the connection of said frame with the tractor to swing laterally.

9. A hitch connection for tractors comprising a draft frame connected with the tractor to oscillate vertically about a point lying below the point of physical connection of said draft frame with the tractor, and draft transmitting means pivotally connected with said draft frame in advance of the connection of said frame with the tractor to swing laterally, and extending rearwardly under said draft frame.

10. A hitch connection for tractors, comprising a draft frame connected with the tractor to oscillate vertically about a point lying below the point of physical connection of said draft frame with the tractor, and laterally swinging draft transmitting means pivotally connected with said draft frame in advance of the connection thereof with the tractor and above the center of oscillation of said frame.

11. A hitch connection for tractors comprising a draft frame connected with the tractor to oscillate vertically about a point lying below the point of physical connection of said frame with the tractor, and approximately at the point of contact of the tractor wheels with the ground, and draft transmitting means pivotally connected with the draft frame.

12. A hitch connection for tractors comprising a draft frame connected with the tractor to oscillate vertically about a point lying below the point of physical connection of said frame with the tractor, and approximately at the point of contact of the tractor wheels with the ground, and draft transmitting means connected with the draft frame in advance of the connection of said frame with the tractor.

13. A hitch connection for tractors comprising a draft frame connected with the tractor to oscillate vertically about a point lying below the point of physical connection of said frame with the tractor, and approximately at the point of contact of the tractor wheels with the ground, and draft transmitting means connected with the draft frame in advance of the connection of said frame with the tractor and extending rearwardly below said draft frame.

14. A hitch connection for tractors comprising a draft frame connected with the tractor to oscillate vertically about a point lying below the point of physical connection of said frame with the tractor, and approximately at the point of contact of the tractor wheels with the ground, and a draft bar pivotally connected with the draft frame in advance of its connection with the tractor to swing laterally, and extending rearwardly below said draft frame.

15. A hitch connection for tractors comprising a draft frame connected with the tractor to oscillate vertically about a point lying below the point of physical connection of said frame with the tractor, and a draft bar pivotally connected with said draft frame to swing laterally and extending rearwardly below the same, the rear portion of said draft bar bearing upwardly against the rear portion of the draft frame.

16. A hitch connection for tractors comprising a draft frame connected with the tractor to oscillate vertically about a point lying below the point of physical connection of said frame with the tractor, a draft bar pivotally connected with said draft frame to swing laterally and extending rearwardly below the same, and a roller mounted on the rear portion of said draft bar and bearing upwardly against the rear portion of the draft frame.

17. A hitch connection for tractors comprising a draft frame connected with the tractor to oscillate vertically about a point lying below the point of physical connection of said draft frame with the tractor, rearwardly extending draft transmitting means connected with said draft frame, and a draft connection pivotally connected with said draft transmitting means to swing laterally relatively thereto.

18. A hitch connection for tractors comprising a draft frame connected with the tractor to oscillate vertically about a point lying below the point of physical connection of said draft frame with the tractor, rearwardly extending draft transmitting means connected with said draft frame, a draft connection, and a coupling forming a vertical pivotal connection between said draft connection and said draft transmitting means.

19. A hitch connection for tractors comprising a draft frame connected with the tractor to oscillate vertically about a point lying below the point of physical connection of said draft frame with the tractor, draft transmittting means pivotally connected with said draft frame in advance of the connection of said frame with the tractor to swing laterally, a draft connection, and a coupling forming a vertical pivotal connection between said draft connection and said draft transmitting means.

20. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, a draft connection, and a coupling forming a vertical pivotal connection between said draft connection and said draft transmitting means.

21. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and means for holding said draft transmitting means against lateral swinging.

22. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, and means for holding said draft transmitting means against lateral swinging.

23. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and means carried by said draft transmitting means and adapted to engage said draft frame to hold said draft transmitting means against lateral swinging.

24. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, and means carried by said draft transmitting means and adapted to engage said draft frame to hold said draft transmitting means against lateral swinging.

25. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, a draft connection, a coupling forming a vertical pivotal connection between said draft connection and said draft transmitting means, and means between said draft transmitting means and the draft frame for holding said draft transmitting means against lateral swinging.

26. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, a draft connection, a coupling forming a vertical pivotal connection between said draft connection and said draft transmitting means, and means between said draft transmitting means and the draft frame for holding said draft transmitting means against lateral swinging.

27. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, a draft connection, a coupling comprising members pivotally connected to each other to turn about a vertical axis, one of the said members being connected with said draft transmitting means and having means adapted to cooperate with said draft frame to hold said draft transmitting means against lateral swinging, and the other coupling member being connected with said draft connection.

28. A hitch connection for tractors comprising a draft frame connected with the tractor to oscillate vertically about a point lying below the point of physical connection of said draft frame with the tractor, draft transmitting means pivotally connected with said draft frame in advance of the connection of said frame with the tractor to swing laterally, and extending rearwardly under said draft frame, a draft connection, a coupling forming a vertical pivotal connection between said draft connection and said draft transmitting means, and means operable by relative vertical movement of the coupling and the draft frame to hold said draft transmitting means against lateral swinging.

29. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, and draft transmitting means pivotally connected with said draft frame and extending rearwardly therefrom.

30. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, and rearwardly extending draft transmitting means connected with said draft frame at a point forward of the connection thereof with the tractor.

31. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, and draft transmitting means connected with said draft frame at a point forward of the point of its connection with the tractor and extending rearwardly thereunder.

32. The combination with a tractor, of a draft frame, means connecting said frame with the tractor for vertical oscillation relatively thereto, comprising spaced rollers and arcuate guides therefor located between the side members of said frame and the side portions of the tractor, said guides being curved to guide said rollers in arcs centered at a point below said draft frame, and draft transmitting means pivotally connected with said draft frame and extending rearwardly therefrom.

33. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, and a draft bar pivotally connected to the forward portion of said draft frame to swing laterally relatively thereto and extending rearwardly thereunder.

34. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, a draft bar pivotally connected to the forward portion of said draft frame to swing laterally relatively thereto and extending rearwardly thereunder, and a roller carried by said draft bar and adapted to bear upwardly against the rear portion of the draft frame.

35. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, a draft bar pivotally connected to the forward portion of said draft frame to swing laterally relatively thereto and extending rearwardly thereunder, and means operable to hold said draft bar against lateral movement relatively to the draft frame.

36. The combination with a tractor, of a draft frame, means connecting said frame with the tractor for vertical oscillation relatively thereto, comprising spaced rollers and arcuate guides therefor, said guides being curved to guide said rollers in an arc centered at a point below said draft frame, a draft bar pivotally connected to the forward portion of said draft frame to swing laterally relatively thereto and extending rearwardly thereunder, a roller carried by said draft bar and adapted to bear upwardly against the rear portion of the draft frame, and means operable to hold said draft bar against lateral movement relatively to the draft frame.

37. A hitch connection for connecting an implement with a tractor, comprising draft transmitting means connected with the tractor to swing vertically, a draft connection having a horizontal pivotal connection with said draft transmitting means and connected with the implement, and a rigid member having a vertically rigid connection with said draft transmitting means and bearing down on the implement, to support said draft transmitting means and said draft connection against buckling downwardly.

38. A hitch connection for connecting an implement with a tractor, comprising a draft frame connected with the tractor to oscillate vertically, draft transmitting means connected with the draft frame and with the implement, and a rigid member connected with said draft transmitting means and bearing downwardly on the implement for holding said draft frame in a substantially horizontal position.

39. A hitch connection for connecting an implement with a tractor, comprising a draft frame connected with the tractor to oscillate vertically, draft transmitting means connected with the draft frame to swing laterally relatively thereto and connected with the implement, and a rigid member connected with said draft transmitting means and bearing downwardly on the implement for holding said draft frame in a substantially horizontal position.

40. A hitch connection for connecting an implement with a tractor, comprising a draft frame connected with the tractor to oscillate vertically, draft transmitting means connected with said draft frame and extending rearwardly, a draft connection having a horizontal pivotal connection with said draft transmitting means and connected with the implement, and means connected with said draft transmitting means and bearing down on the implement for holding said draft transmitting means and said draft connection against buckling downwardly.

41. A hitch connection for connecting an implement with a tractor, comprising a draft frame connected with the tractor to oscillate vertically about a point lying below the point of physical connection of said draft frame with the tractor, rearwardly extending draft transmitting means pivotally connected with said draft frame to swing laterally thereunder, a coupling member connected with said draft transmitting means, a second coupling member having a vertical pivotal connection with said first-mentioned coupling member, a draft connection having a horizontal pivotal connection with said second coupling member and connected with the implement, and a bar rigidly connected with said second coupling member and adapted to bear downwardly on the implement.

42. A hitch connection for connecting an implement with a tractor, comprising a draft frame connected with the tractor to oscillate vertically about a point lying below the point of physical connection of said draft frame with the tractor, rearwardly extending draft transmitting means pivotally connected with said draft frame to swing laterally thereunder, a coupling member connected with said draft transmitting means, means carried by said coupling member movable downwardly into engagement with said draft frame to hold said draft transmitting means against lateral swinging, a second coupling member having a vertical pivotal connection with said first-mentioned coupling member, a draft connection having a horizontal pivotal connection with said second coupling member, and a bar rigidly connected with said second coupling member and adapted to bear downwardly on the implement.

43. A hitch connection for connecting an implement with a tractor, comprising a draft frame connected with the tractor to oscillate vertically about a point lying below the point of physical connection of said draft frame with the tractor, rearwardly extending draft transmitting means pivotally connected with said draft frame to swing laterally thereunder, a coupling member connected with said draft transmitting means, means carried by said coupling member movable downwardly into engagement with said draft frame to hold said draft transmitting means against lateral swinging, a roller carried by said draft transmitting means and bearing upwardly against the rear portion of the draft frame, a second coupling member having a vertical pivotal connection with said first-mentioned coupling member, a draft connection having a horizontal pivotal connection with said second coupling member, and a bar rigidly connected with said second coupling member and adapted to bear downwardly on the implement.

44. A hitch connection for connecting an implement with a tractor, comprising a draft frame connected with the tractor to oscillate vertically about a point lying below the point of physical connection of said draft frame with the tractor, rearwardly extending draft transmitting means pivotally connected to the draft frame to swing laterally relatively thereto, and bearing upwardly thereagainst, a draft connection having a horizontal pivotal connection with said draft transmitting means and connected with the implement, and a bar having a vertically rigid connection with said draft transmitting means and adapted to bear downwardly on the implement.

45. A hitch connection for connecting an implement with a tractor, comprising a draft frame connected with the tractor to oscillate vertically about a point lying below the point of physical connection of said draft frame with the tractor, rearwardly extending draft transmitting means pivotally connected to the draft frame to swing laterally relatively thereto, and bearing upwardly thereagainst, a draft connection having horizontal and vertical pivotal connections with said draft transmitting means and connected with the implement, and a bar having a vertically rigid connection with said draft transmitting means and adapted to bear downwardly on the implement.

46. A hitch connection for tractors comprising a framework connected to the tractor and movable with respect thereto to impose upon the tractor forces tending to pull its front end downward as a result of forces placed on the framework from any direction by the tractive resistance of an implement connected to the framework.

47. A hitch connection for tractors comprising a draft frame connected to the tractor by rollers bearing in an arcuate path, the center of which is located at the point of bearing of the wheels of the tractor on the ground, said frame and rollers cooperating to place the tractor under stresses tending to force its front end downward as a result of tractive effort on said framework from the rear at any angle.

48. A hitch connection for tractors comprising a draft-transmitting member, and connecting means connected with the tractor and supporting said member to oscillate vertically about a point lying below the point of physical connection of said connecting means with the tractor, and to move laterally relatively to the tractor.

49. A hitch connection for tractors comprising a draft-transmitting member, and means connecting said member with the tractor to swing in a substantially horizontal plane with respect to the tractor, and to oscillate vertically about a point lying below the point of physical connection of said connecting means with the tractor.

50. A hitch connection for tractors comprising a draft-transmitting member, means pivotally connecting said member with the tractor for movement in a substantially horizontal plane with respect to the tractor, said means also including means for connecting said member to the tractor to oscillate vertically about a point lying below the point of physical connection of said connecting means with the tractor.

51. A hitch connection for tractors comprising a draft-transmitting member, and intermediate connecting means between said member and the tractor by which said member has oscillatory movement in a vertical plane with respect to the tractor about a point lying below and outside of said intermediate connections, said connecting means including a vertical pivot about which said member has pivotal movement in a horizontal plane.

WILLIAM L. PAUL.